Sept. 6, 1966 W. J. HALL 3,270,445
SLIDE CHANGING MEANS
Filed Nov. 1, 1963 5 Sheets-Sheet 1

INVENTOR.
Walter J. Hall,
BY
Grist, Lockwood, Greenawalt & Dewey
Attys.

Sept. 6, 1966  W. J. HALL  3,270,445
SLIDE CHANGING MEANS

Filed Nov. 1, 1963  5 Sheets-Sheet 2

Fig. 3

INVENTOR.
Walter J. Hall,
BY
Dreist, Lockwood, Greenawalt + Dewey
attys.

Sept. 6, 1966 W. J. HALL 3,270,445
SLIDE CHANGING MEANS
Filed Nov. 1, 1963 5 Sheets-Sheet 3

INVENTOR.
Walter J. Hall,
BY
Greist, Lockwood, Greenawalt & Dewey
Attys

Sept. 6, 1966 W. J. HALL 3,270,445
SLIDE CHANGING MEANS

Filed Nov. 1, 1963 5 Sheets-Sheet 4

INVENTOR.
Walter J. Hall,
BY
Greist, Lockwood, Greenawalt & Dewey
ATTYS

United States Patent Office 3,270,445
Patented Sept. 6, 1966

3,270,445
SLIDE CHANGING MEANS
Walter J. Hall, Chicago, Ill., assignor to Sawyers Research Development Corporation, Chicago, Ill., a corporation of Delaware
Filed Nov. 1, 1963, Ser. No. 320,766
17 Claims. (Cl. 40—36)

This invention relates to slide changing devices for slide projectors, and more particularly to new and improved means for providing automatic, cyclic operation of a slide changing device at selected intervals of time.

This invention pertains to the type of automatic slide projectors having an oscillating or reciprocating slide changer for transferring slides from a magazine to a slide viewing position in the projector and for returning the slides to the magazine. In these projectors an electric cycle motor is operatively associated with the slide changer so that upon energizing of the motor the slide changer is cycled for returning the slide to the magazine and for transferring the next slide in the magazine to the viewing position in the projector. The present invention is directed to new and improved timing means for automatically energizing the cycle motor at selected intervals of time for bringing about cyclic operation of the slide changer.

A primary object of the present invention is to provide timing means for automatically cycling a slide changer between opposite positions at selected intervals of time, wherein initiation of operation of the timing means is brought about by movement of the slide changer to one of the opposite positions thereof.

It is a further object of the present invention to provide timing means for automatically cycling a slide changer at selected intervals of time, wherein initiation of operation of the timing means is brought about by movement of the slide changer to its viewing position and wherein the timing means is automatically reset upon movement of the slide changer away from its slide viewing position.

It is another object of the present invention to provide timing means for automatically cycling a slide changer at predetermined intervals of time, the timing means including selector means for selecting a number of different intervals of time.

A further object of the present invention is the provision of timing means for automatic cycling of a slide changer at selected intervals of time, which timing means includes new and improved gearing means for performing the timing action.

Still another object of the present invention is the provision of timing means for automatically cycling a slide changer at selected intervals of time, which timing means includes gear means adapted to be driven by means of a friction drive from an electric motor forming a component part of a projector.

These and other objects and advantages of the invention will become apparent from the following specification showing a preferred embodiment of the invention which is illustrated in the accompanying drawings.

Referring now to the drawings, the projector, generally designated 10, includes a projector casing having a base plate 11 and an upper casing portion 12 fitted thereover. The upper casing portion is provided with a slide-tray-receiving channel or groove 13 which extends along one side of the casing and is open at its top and opposite ends for receiving a known type of slide magazine 14 which supports a plurality of slides in parallel spaced-apart relation.

Figure 1:
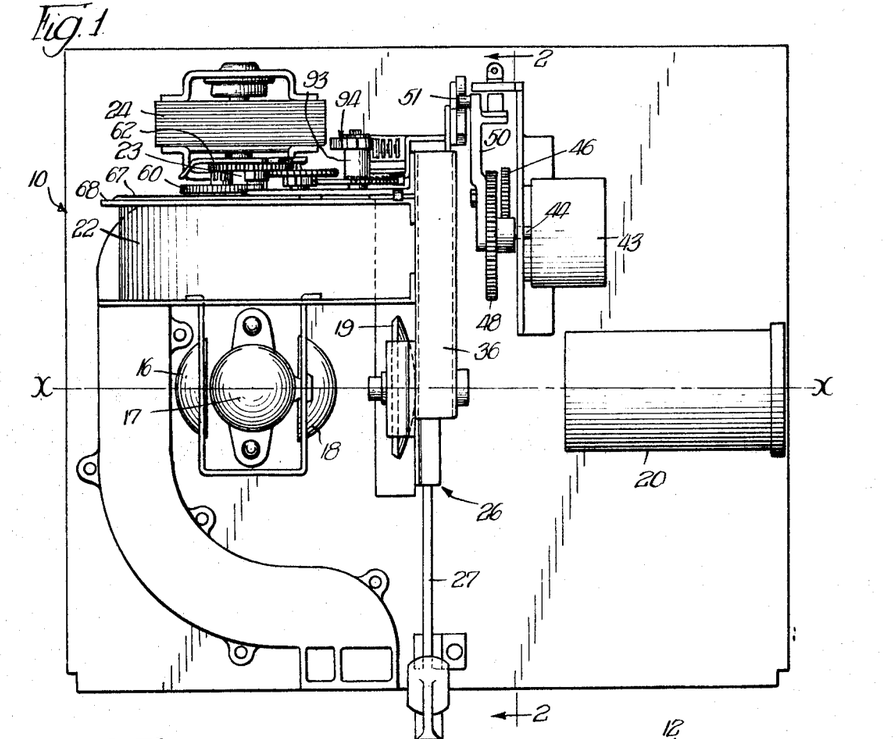
FIG. 1 is a top plan view of a slide projector having the timing means of this invention associated therewith, the casing and many parts of the projector not being shown for better illustration of the present invention.
Figure 3:
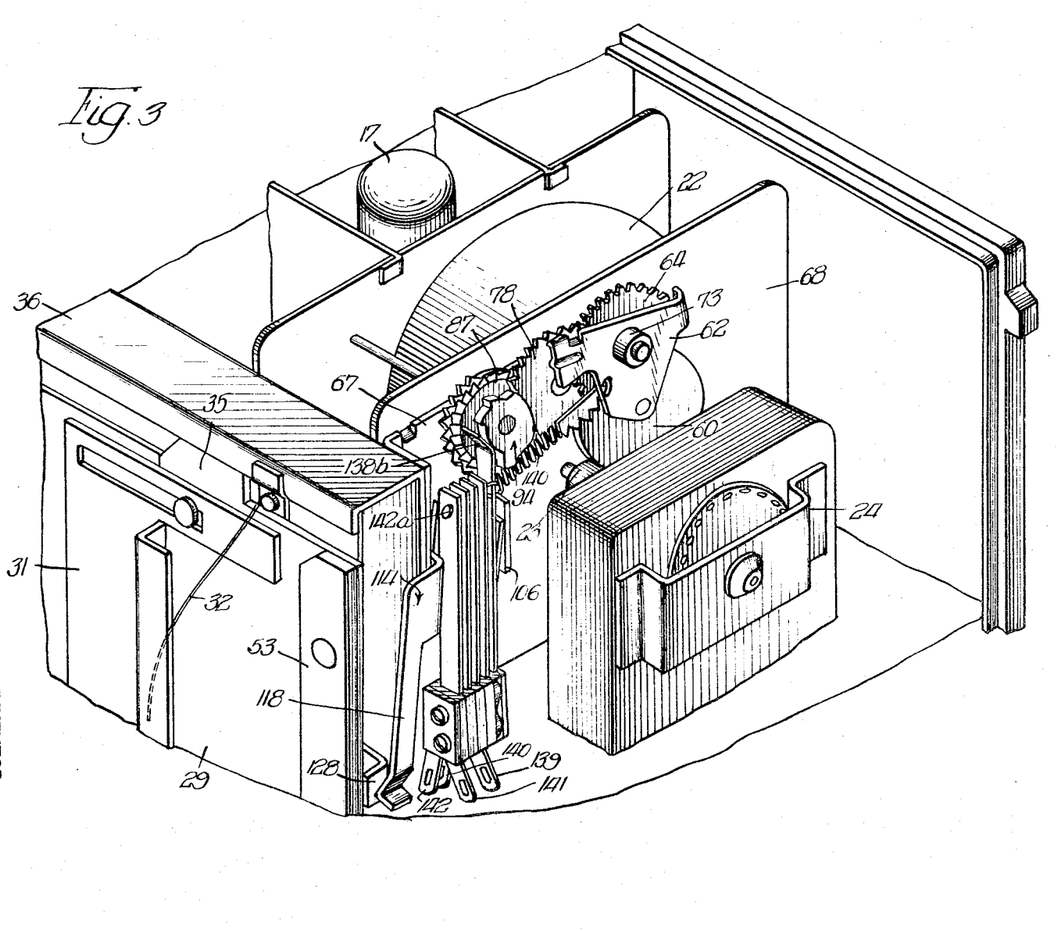
FIG. 3 is an enlarged, fragmentary, perspective view of the slide projector primarily showing the timing means and the driving means therefor.

The optical axis of the projector is indicated by line X—X in FIG. 1. The projector includes a reflector 16, a lamp 17, lenses 18 and 19 and a focusing lens housing 20 disposed in spaced-apart relation along the optical axis. The projector further includes a blower assembly 22 driven by a shaft 23 (FIG. 3) which is in turn driven by an electric motor 24. The blower assembly draws air past bulb 17 for reducing the temperature within the projector casing.

Figure 2:
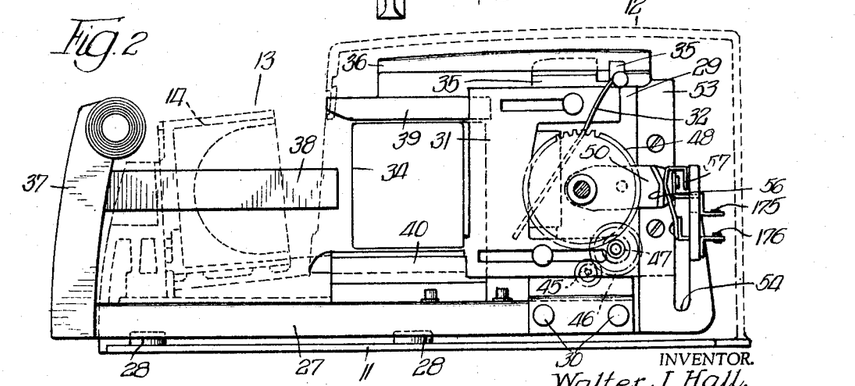
FIG. 2 is a section taken along line 2—2 of FIG. 1.

The projector includes a slide changer, generally designated 26, which is reciprocal transversely of optical axis X—X for transferring a slide from its stored position in magazine 14 to a viewing position in the projector in alignment with the optical axis thereof, and for returning the slide from the viewing position to the magazine, this reciprocal movement defining a cycle of operation of the slide changer. As best seen in FIG. 2, the slide changer includes a lower bar 27 which is slidable in a pair of support blocks 28 mounted on base plate 11 of the projector. A vertically extending plate 29 is supported on the inner end of bar 27 by suitable fastening means, such as fasteners 30. A shutter 31 is supported on plate 29 for horizontal sliding movement relative thereto, and a spring arm 32 mounted on plate 29 and engageable with the shutter is provided for constantly urging the shutter to the left as seen in FIG. 2. The slide changer carries a flipper arm (not shown) for returning slides to the magazine at a faster speed than the speed of the slide changer. Shutter 31 is provided for preventing passage of light along the optical axis of the projector during operation of the flipper arm in returning a slide from slide viewing aperture 34 to magazine 14. This flipper arm and shutter are fully disclosed in the application of Kenneth E. Golden, filed on August 6, 1963, Serial No. 303,984.

The slide changer further includes an upper slide member 35 supported by plate 29 and slidable along a depending flange of a member 36 which is secured in place in the projector by suitable means (not shown). Bar 27 of the slide changer supports a vertically extending handle member 37 at the outer end of the lower bar. The handle adapts the slide changer to be reciprocated by hand when desired. Handle 37 supports a horizontally extending pusher bar 38 which is adapted to pass between the partition plates of magazine 14 for engaging one side of a slide stored therein for sliding the same between upper and lower guide tracks 39 and 40, respectively, partly defining viewing aperture 34. It will be understood that the slide changer is operatively associated with suitable magazine indexing means (not shown) for indexing or stepping the magazine in one direction or the other during each cycle of movement of the slide changer. The indexing means includes selector means for selecting the direction of magazine movement during operation of the slide changer.

The projector includes powered drive means for reciprocating the slide changer between opposite positions which may be termed a loading position and a slide viewing position. When the slide changer is in the loading position, the free end of pusher bar 38 is disposed just clear of the outer vertical wall of slide magazine 14. The slide changer is illustrated in its slide viewing position in FIG. 2, and when the slide changer is in this position a slide being carried thereby is disposed in alignment with slide viewing aperture 34. The drive means for reciprocating the slide changer may be of any suitable type. The drive means illustrated is of the type disclosed in the pending application of Karl F. Kurz, Serial No. 188,107, filed April 17, 1962, now Patent No. 3,183,774.

The drive means shown includes an electric cycle motor 43 which includes a reciprocal and rotatable drive shaft 44 having a pinion gear 45 mounted on one end thereof. When motor 43 is energized, pinion gear 45 is substantially simultaneously rotated and axially shifted into meshing engagement with an intermediate gear 46, which intermediate gear carries a pinion gear 47. Pinion gear 47 is in meshing engagement with a drive gear 48. A radially extending arm 50 is secured to one face of drive gear 48, and arm 50 carries a pin 51 at its outer or free end, which pin has its axis parallel with the axis of rotation of drive gear 48. The distance between the axis of pin 51 and the axis of rotation of drive gear 48 is approximately equal to one-half the distance of the path of movement of the slide changer between its loading position and its slide viewing position or vice versa.

Pin 51, which is rotatable in a circular path during rotation of drive gear 48, is adapted to engage the vertical edge of a J-shaped member 53 which is secured to a vertical edge of plate 29 associated with the slide changer for moving the slide changer from its slide viewing position to its loading position. Pin 51 is adapted to be received in a vertically extending slot 54 (FIG. 2) defined by the J-shaped member for moving the slide changer between its loading position and its slide viewing position.

It will be understood that when cycle motor 43 is energized, drive shaft 44 is rotated and axially moved from right to left, as seen in FIG. 1, for bringing about meshing engagement of pinion gear 45 with the intermediate gear 47 thereby resulting in rotation of the drive gear by the cycle motor. After arm 50 has been driven through a complete revolution by cycle motor 43 a finger 56 integral with arm 50 contacts a normally closed cycle-stop switch 57 for opening the same. As will be explained below in connection with the circuit of the slide projector, opening of switch 57 causes the cycle motor to be de-energized. In FIG. 2, finger 56 is shown in contact with switch 57 for opening the latter thereby de-energizing cycle motor 43.

The timing means for automatically energizing cycle motor 43 at selected intervals of time for cycling the slide changer will now be described.

Referring now to FIGS. 3-6, a power take-off wheel 60 is rotatably mounted on a pin 61 which is secured to a timer selector plate 62 for having its periphery brought into frictional engagement with the surface of drive shaft 23. It will be understood that power take-off wheel 60 is driven from drive shaft 23 when the power take-off wheel is in frictional engagement with the drive shaft.

Power take-off wheel 60 includes a concentric pinion gear 63 having teeth in meshing engagement with a first intermediate gear 64. Intermediate gear 64 is mounted for rotation about a pin 66 which is secured at one end thereof to a mounting plate 67. Mounting plate 67, which is vertically disposed, may be mounted by suitable fastening means (not shown) to housing plate 68 forming a part of blower assembly 22. Intermediate gear 64 includes an integral, concentric pinion gear 70 and a further integral concentric hub 71 adapted to engage one face of plate 67 for maintaining gear 64 in proper spaced relation from plate 67. A friction washer 72 adapted to be received on pin 66 between selector plate 62 and intermediate gear 64 holds the selector plate and first intermediate gear in close but spaced relation so that the first intermediate gear may turn freely relative to the selector plate. Gear 64 is fastened on pin 66 by means of a collar 73 and split ring 74, which split ring is adapted to be received in an annular groove 75 formed in the outer or free end of pin 66.

Pinion gear 70, which includes only a pair of diametrically oppositely disposed teeth, is in meshing engagement with a second intermediate gear 78. Intermediate gear 78 is rotatably mounted on a pin 79 which is supported at one end thereof in an aperture (not shown) in mounting plate 67. Pin 79 includes a rounded projection 80 at the outer or free end thereof. The function of projection 80 will be referred to hereinbelow.

The second intermediate gear includes an integral pinion gear 82 which is provided with four equally spaced-apart teeth 83. Intermediate gear 78 also includes a concentric integral hub 84 adapted for engagement with plate 67 for holding the intermediate in proper spaced relation from the mounting plate.

Figure 4:
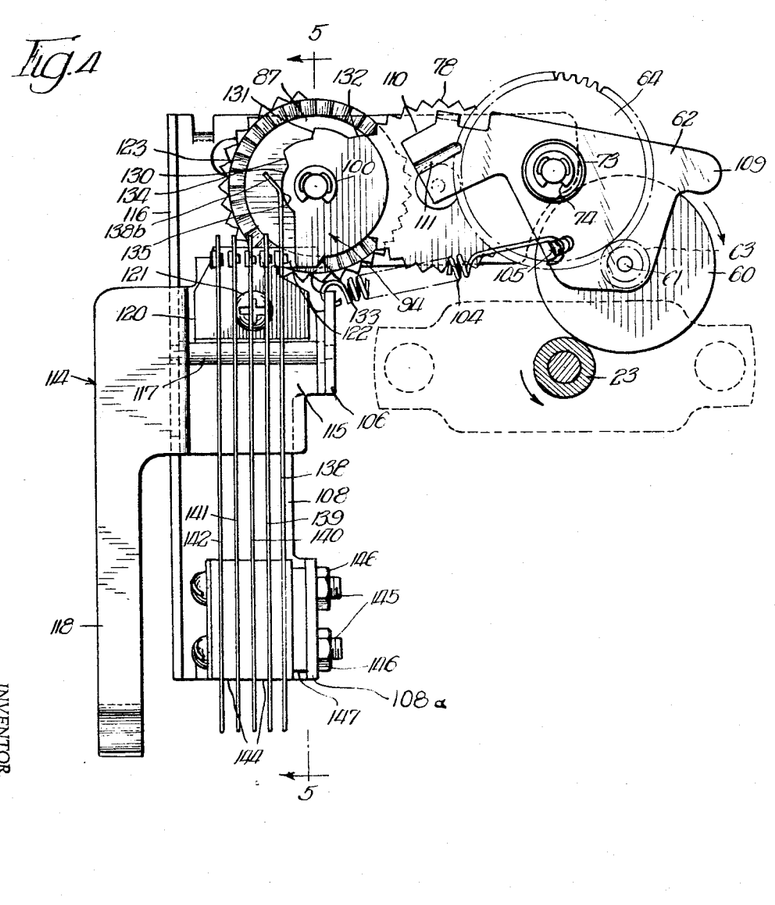
FIG. 4 is an enlarged elevational view of the timing means of this invention.
Figure 7:
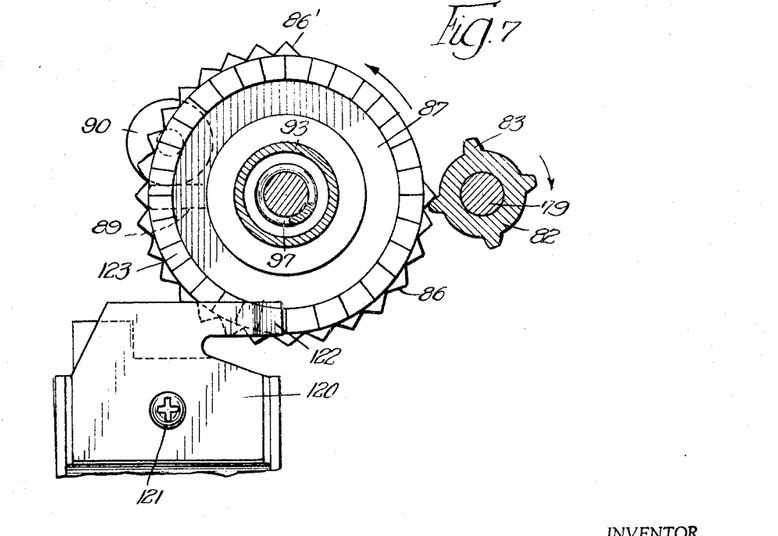
FIG. 7 is an enlarged section taken along line 7—7 of FIG. 6.

As best seen in FIG. 7, teeth 83 on pinion gear 82 are adapted for meshing engagement with a series of teeth 86 extending along the periphery of a driven gear 87. As noted in FIG. 7, teeth 86 extend through an arc of approximately 270° about the periphery of the driven gear. Driven gear 87 is centrally bored and includes a concentric spacer hub 88 on one side thereof, hub 88 being adapted to engage plate 67 for holding the driven gear in proper spaced relation from the mounting plate. Driven gear 87 is also provided with an integral, radially extending arm 89, which arm is adapted to engage a rubber grommet 90 secured in an aperture 91 in the mounting plate. This engagement between arm 89 and grommet 90 limits rotation of driven gear 86 in a clockwise direction as seen in FIGS. 4 and 7.

A spacer sleeve 93 has one end thereof secured to driven gear 87 in concentric relation with the central bore in the latter. The other end of spacer sleeve 93 is secured to a switch actuating member 94 for supporting the latter for rotary movement with the driven gear. Switch actuating member 94 includes a bore in concentric relation with sleeve 93 and the bore in the driven gear thereby adapting the assembly including the driven gear, the spacer and the switch actuating member for receiving a pin 96 having one end thereof secured to mounting plate 67. The central bores in the driven member and the switch actuating member are of a diameter for smoothly engaging pin 96. However, the inside diameter of the spacer sleeve is somewhat larger than the diameter of the pin 96 for accommodating a coil spring 97 which encircles pin 96. One end 98 of this spring is anchored or received in a small aperture (not shown) provided in the mounting plate in close proximity to the juncture of pin 96 and the mounting plate. The other end 99 of coil spring 97 is suitably secured to either sleeve 93 or switch actuating member 94. It will be understood that coil spring 97 constantly urges the assembly including driven gear 87, spacer sleeve 93 and switch actuating member 94 in a clockwise direction as seen in FIGS. 4 and 7. It will be recalled that the engagement of arm 89 with grommet 90 limits or stops rotation of driven gear 87 in a clockwise direction thereby limiting movement of member 94 in a clockwise direction as the latter is fixed with the driven gear for movement with the same. Driven gear 87, spacer 93 and switch actuating member 94 are held on pin 96 by a split ring 100 which is adapted to be received in an annular groove 101 formed in the outer or free end of pin 96.

It will be understood that selector plate 62 is rotatable about pin 66 for moving power take-off wheel 60 into or away from frictional engagement with shaft 23. Power take-off wheel 60 is urged into frictional engagement with shaft 23 by means of a spring 104. Spring 104 is provided with a hook at one end thereof which engages a clip 105 formed in plate 62. The other end of spring 104 is hooked in an aperture (not shown) formed in an ear 106, which ear is integral and at a right angle with a depending leg portion 108 of mounting plate 67.

Selector plate 62 includes a finger gripping tab 109 at one end thereof. The other end of the selector plate is provided with a tab 110 which is indented to form a short rib 111 on the side of plate 62 which faces intermediate gear 78. Rib 111 is adapted for engagement with rounded projection 80 during rotation of the selector plate about pin 66. When the selector plate is rotated in a counterclockwise direction, as viewed in FIG. 4, until rib 111 passes over and then beneath projection 80 (when this occurs power take-off wheel 60 is swung away from frictional engagement with shaft 23) rib 111 engages projection 80 thereby preventing spring 104 from rotating plate 62 in a clockwise direction and returning the power take-off wheel to frictional engagement with drive shaft 23. The engagement between rib 111 and projection 80 is such that plate 62 may be easily rotated by hand for returning power take-off wheel 60 to frictional engagement with the drive shaft. As it will become apparent herein, the provision of selector plate 62 provides a means for de-activating the timing means.

When power take-off wheel 60 is in frictional engagement with shaft 23 and when the latter is being driven by blower motor 24, the power take-off wheel is driven in a clockwise direction (as seen in FIG. 4) which results in pinion gear 82 being driven in a clockwise direction (as seen in FIG. 7) by virtue of meshing engagement of the teeth on pinion gear 63, first intermediate gear 64, pinion gear 70, second intermediate gear 78. Power take-off wheel 60 is driven at a relatively high r.p.m., but by reason of the various intermediate and pinion gears which in effect constitute a gear reduction means, pinion gear 82 is rotated at a relatively low r.p.m. In the embodiment of the invention shown for purposes of illustration, pinion gear 82 is rotated in the area of about 13 r.p.m. Although the speed of rotation of pinion gear 82 figures in determining the time between cycles of operation of the slide changer this particular r.p.m. is not to be taken as limiting as it will become apparent from the following specification that the speed of rotation of pinion gear 82 may be varied as its speed is only one of a number of factors which determine a timed cycle.

Now referring to FIG. 7 it will be realized that rotation of pinion gear 82 in a clockwise direction results in rotation of driven gear 87 in a counterclockwise direction. It will be recalled that coil spring 97 constantly urges driven gear 87 into rotation in a clockwise direction, i.e., opposite the direction of movement being given to it by pinion gear 82. Because of the wide spacing of teeth 83 on pinion gear 82, each time one of the teeth 83 engage one of the teeth 86 on driven gear 87 for moving the latter in a counterclockwise direction, spring 97 acts to move driven gear 87 in a clockwise direction for returning arm 89 into engagement with grommet 90 before the next successive tooth 83 is able to engage the next tooth 86 on the driven gear. Accordingly, constant uniform rotation of pinion gear 82 provides constant oscillating movement of the driven gear.

Oscillating movement of driven gear 87 causes corresponding movement of switch actuating member 94 as the driven gear and switch actuating member are fixed together for rotation in unison. As will become apparent hereinbelow, the switch actuating member must be rotated through a cycle path or arc substantially greater than the amount of arcuate movement it receives during oscillation of the driven gear before the switch actuating member is rotated to a position for actuating the switch means forming a part of the timing mechanism. Timer start means are provided for temporarily preventing rotation of the driven gear in a clockwise direction only, thereby permitting pinion gear 82 to rotate the driven gear in a counterclockwise direction and through a sufficient arc or path for rotating the switch actuating member to position for actuating switch means to be explained below.

The timer-start means include an arm assembly generally designated 114. The arm assembly includes a generally U-shaped member 115 which is adapted to be received between ear 106 and a flange 116 which is integral with mounting plate 67 and extends in parallel relation with ear 106. The legs defining U-shaped member 115 are provided with respective aligned apertures for receiving opposite ends of a pin 117, which pin has reduced-in-diameter portions at its opposite ends received in aligned apertures provided in ear 106 and flange 116, respectively. It will be understood then that member 115 is adapted for limited pivoting movement about an axis defined by pin 117. U-shaped member 115 includes an integral depending arm 118 which is adapted to be engaged by the slide changer, when the latter is in its slide viewing position, for a purpose which will become apparent below.

A small metal plate 120 (FIG. 7) is secured in the bight portion of U-shaped member 115 by suitable means such as a threaded fastener 121. Plate 120 includes a flexible arm or detent 122 in the nature of a pawl. Pawl 122 is adapted for engagement with an annular series of ratchet teeth 123 formed on one side of driven gear 87. It will be understood that when pawl 122 is in engagement with ratchet teeth 123, the pawl will permit rotation of the driven gear in a counterclockwise direction (as seen in FIG. 7) but will prevent rotation of the driven gear in a clockwise direction. A small coil spring 125 (FIG. 5) interposed between depending leg portion 108 of mounting plate 67 and the bight portion of U-shaped member 115 constantly urges pawl 122 out of engagement or away from ratchet teeth 123. Spring 125 is held in place by engagement of its opposite ends with the stem portion of fastener 121 and with an annular lip (not shown) formed by punching an aperture in leg 108 in approximate alignment with fastener 121.

It should be realized that when detent 122 is in engagement with ratchet teeth 123 on the driven gear, rotation of pinion 82 in a clockwise direction provides intermittent rotation of driven gear 87 in a counterclockwise direction.

Figure 5:
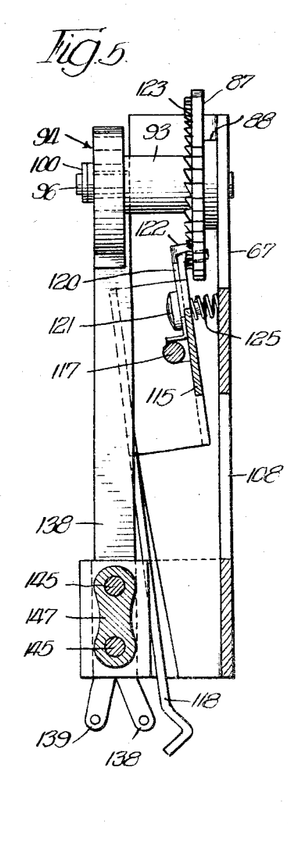
FIG. 5 is a section taken along line 5—5 of FIG. 4.
Figure 6:
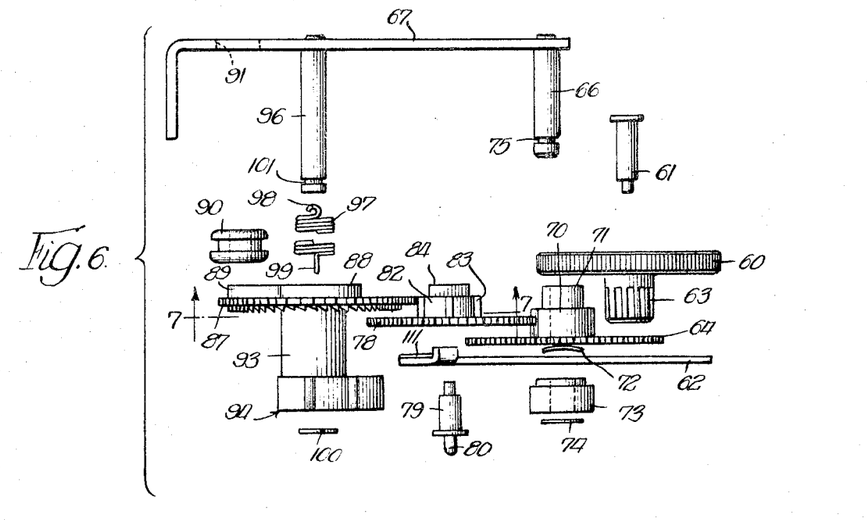
FIG. 6 is an exploded top plan view of certain parts of the timing means.

Detent 122 is brought into engagement with ratchet teeth 123 by pivoting or swinging movement of the arm assembly 114 in a clockwise direction as seen in FIG. 5. This pivoting movement of the arm assembly is brought about by engagement of the lower end of arm 118 with a lug 128 (FIG. 3) carried by the slide changer. This engagement between lug 128 and the lower end of arm 118, which occurs only when the slide changer is in its slide viewing position, results in pivoting movement of the arm assembly for moving detent 122 into engagement with ratchet teeth 123 on the driven gear. When the slide changer is moved away from its slide viewing position and toward its loading position lug 128 moves out of engagement with the lower end of arm 118. When this occurs, spring 125 acts to move detent 122 out of engagement with the ratchet teeth on the driven gear thereby allowing coil spring 97 to rotate the driven gear in a clockwise direction (FIG. 7) until arm 89 on the driven gear comes into contact with grommet 90 supported by mounting plate 67. As will become apparent below, engagement of lug 128 on the slide changer with arm 118 initiates a cycle of operation of the timing means, and disengagement of a lug 128 from arm 118 allows re-cycling or re-setting of the timing means.

As noted in FIG. 4, switch actuating member 94 includes four switch actuating surfaces 130–133. The radial distances between the surfaces and the axis of rotation of the switch actuating member increase progressively from surface 130 to surface 133. The angular or arcuate spacing between surfaces 130 and 131 and between surfaces 131 and 132 is the same. Switch actuating member 94 also includes an arcuate surface 134 having a mid-point 135. The angular distance between mid-point 135 and surface 130 is equal to the angular spacing between surfaces 130 and 131 or surfaces 131 and 132. The angular spacing between surfaces 132 and 133 is equal to the angular spacing between point 135 and surface 132.

As best seen in FIGS. 4 and 5, a multi-contact blade-type switch is associated with the timing means. The blade-type switch includes a plurality of parallel, spaced-apart, aligned blades 138–142, blades 139–142 being identical with one exception to be mentioned below and blade 138 being slightly longer than the remaining blades and provided with an inclined tip 138b which is adapted to be engaged by the switch actuating member surfaces upon rotation of the switch actuating member. Blades 138–142 are secured in parallel spaced relation by a plurality of dielectric spacers 144 and a pair of fasteners 145 which pass through suitable apertures in the blades and dielectric spacers and pass through apertures provided in an ear plate 108a which is integral with mounting plate leg 108 and extends at a right angle to the latter. Fasteners 145 include a pair of nuts 146. A suitable spacer 147 is provided for holding the various blades and dielectric blocks in spaced relation from ear plate 108a. The lower ends of alternate blades 138–142 are inclined in opposite directions as seen in FIG. 5, and these lower ends are apertured for ready engagement with the ends of suitable electric lead wires or conductors. Blades 138–142, carry respective contacts 138a–142a, adjacent their free ends.

It will be understood that blades 138–142 are formed of a flexible material adapting the blades to be readily deflected for bringing about engagement of the various contacts carried thereby. The spacing between the blade contacts and the spacing between blade tip 138b and the various surfaces on switch actuating member 94 are such that rotation of switch actuating member 94 in a counterclockwise direction for bringing surface 130 into engagement with tip 138b brings about closing of contact 138a with contact 139a. Engagement of surface 131 with tip 138b results in closing contact 139a with contact 140a. Continued rotation of the switch actuating member for engagement of surface 132 with blade tip 138b brings about engagement of contact 140a with contact 141a. Finally, continued rotation of the switch actuating member for engagement of surface 133 with tip 138b brings about engagement of contact 141a with contact 142a. It will be understood that when surface 130 is in engagement with tip 138b, current may pass from blade 138 to blade 139. When surface 131 is in engagement with tip 138b, current may flow between blade 138 and blade 140. In other words, current passes from blade 138 to the last blade having its contact in engagement with the contact on the preceding blade. In the embodiment of the invention illustrated, the speed of rotation of pinion gear 82 is such that when detent 122 engages ratchet teeth 123, surface 130 is rotated into contact with tip 138b after a five second period of time, surface 131 is rotated into contact with tip 138b after a ten second period, surface 132 is rotated into contact with tip 138b after a fifteen second period, and surface 133 is rotated into contact with tip 138b after a thirty second period of time.

Figure 8:
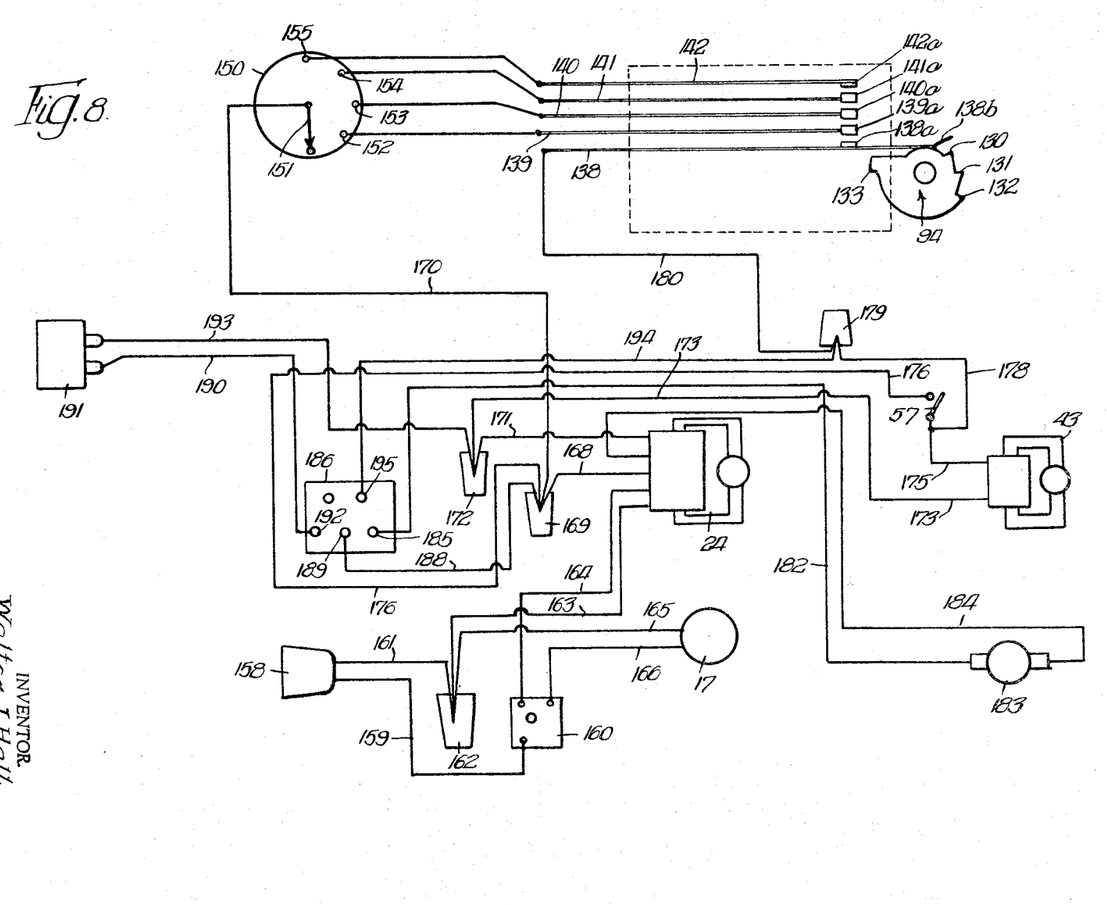
FIG. 8 is a diagrammatic view illustrating the various circuits in the slide projector having the timing means of this invention associated therewith.

Referring now to the schematic diagram illustrated in FIG. 8, the timing mechanism of this invention further includes a selector switch 150. This switch includes a movable contact 151 which is adapted to be manually moved by a control knob (not shown) mounted on the exterior of the projector casing. Selector switch 150 includes a number of fixed contacts 152–155. For purposes of illustration, contacts 152–155 represent five, ten, fifteen, and thirty second periods of time, respectively. It will be understood that rotation of movable contact 151 for bringing the same into contact with one of the fixed contacts provides a means for selecting the timing cycle or interval of time desired between cycles of movement of the slide changer.

It will be understood that suitable electric conductors are provided for placing contacts 152–155 in electrical communication with blades 139–142, respectively.

The components of the slide projector and timing means heretofore mentioned or described are schematically illustrated in FIG. 8. The other components of the projector, which of themselves form no part of the present invention, illustrated in FIG. 8 will now be described.

Power is supplied to the projector through a plug 158 connected with a first conductor 159 extending to an off-fan-lamp switch 160, and plug 158 is connected with a second conductor 161 extending to a conventional wire nut 162. A conductor 163 connects wire nut 162 with fan motor 24, and a conductor 164 connects the fan motor with the "fan" terminal of switch 160. Conductors 165 and 166 connect lamp 17 with wire nut 162 and the "lamp" terminal of switch 160.

A conductor 168 extends from cycle motor 24 to a wire nut 169, and a conductor 170 connects wire nut 169 with movable contact 151 of selector switch 150. A conductor 171 connects electric motor 24 with a wire nut 172, and a conductor 173 connects wire nut 172 with cycle motor 43. It will be understood that current is always supplied to conductors 168 and 171 when a source of power is applied to the projector and switch 160 is in either the "fan" or "lamp" position.

A conductor 175 connects cycle motor 43 with cycle-stop switch 57. A conductor 176 extends between cycle-stop switch 57 and wire nut 169 which is connected with motor 24 by means of conductor 168.

A conductor 178 connects conductor 175 with a wire nut 179, and a conductor 180 extends from wire nut 179 to blade 138 of the multiple blade switch.

A conductor 184 extends from blower motor 24 to a focus motor 183, and a conductor 182 connects focus motor with a "focus" terminal 185 of a socket 186. Socket 186 is mounted on the exterior of the casing and is adapted to receive the pins of a detachable remote control hand piece which is disclosed and claimed in my co-pending application, Serial No. 248,312, filed December 31, 1962, now Patent No. 3,221,598. Current is applied to conductor 184 when power is applied to the projector and when selector switch 60 is in either the "fan" or "lamp" position. It will be understood that focus motor 183 is operatively associated with lens housing 20. The operation of the focusing means of the projector will not be referred to herein as it forms no part of the present invention.

A conductor 188 connects a common terminal 189 of socket 186 with wire nut 169, which wire nut is connected with motor 24 by means of conductor 168. A conductor 190 connects a forward-reverse solenoid 191 with a "forward-reverse" terminal 192 of socket 186. It will be understood that solenoid 191 is operatively associated with the slide magazine indexing means (not shown) for changing the direction of movement of the slide magazine. A conductor 193 extends from solenoid 191 to wire nut 172. Finally, a conductor 194 extends from a "cycle" terminal 195 in socket 186 to wire nut 179.

The cycle of operation of the timing means of this invention for cycling slide changer 26 at selected intervals of time is as follows:

Let it be assumed that power is supplied to the projector, that switch 160 is in the "lamp" position, and that a magazine containing slides is positioned in groove 13. Further, let it be assumed that it is desired to cycle the slide changer every five seconds, i.e., it is desired to view a slide for an approximate five second period of time. Accordingly, movable contact 151 of selector switch 150 is moved until it is placed into engagement with contact 152.

The slide changer must be moved to its loading position to permit entry of magazine 14 into groove 13. The slide changer may be moved to its slide viewing position manually by means of hand piece 37 or it may be moved to the slide viewing position by actuating the "cycle" button on the hand piece which is electrically connected with socket 186. If the cycle button is actuated for moving the slide changer to its slide viewing position the circuit for this operation is as follows: Conductors 168, 176, terminals 189, 195, conductors 194, 178, 175, motor 43, conductors 173, 171. This operation causes energizing of motor 43 for shifting slide changer 26 to its slide viewing position. It will be recalled that when the slide changer drive means moves the slide changer to its slide viewing position, finger 56 on arm 50 engages cycle-stop switch 57 for opening the same. Accordingly, after the slide changer has been moved to its slide viewing position by means of cycle motor 43, switch 57 is in its open position as illustrated in FIG. 8.

As soon as the slide changer reaches the slide viewing position, lug 128 on the slide changer engages the lower end of arm 118 for bringing detent 122 into engagement with ratchet teeth 123 on driven gear 87. As power is being supplied to blower motor 24, rotating shaft 23 drives power take-off wheel 60 for constantly oscillating driven gear 87 in the manner described above. Now, as detent 122 is brought into engagement with the ratchet teeth on the driven gear, the latter is prevented from rotating in a clockwise direction as seen in FIG. 7, and a timed cycle of operation of the timing means begins. Pinion gear 82 drives the driven gear in a counterclockwise direction (FIG. 7) until the switch actuating member carried thereby is rotated so that its surface 130 comes into contact with tip 138b of blade 138. When this occurs, i.e., after a five second period of time, contact 138a of blade 138 is brought into engagement with contact 139a on blade 139 and the cycle motor is energized for reciprocating the slide changer from its slide viewing position to its loading position and then back to its slide viewing position. The circuit for this operation is as follows: conductors 168, 170, movable contact 151, stationary contact 152, blade 139, contacts 139a, 138a, blade 138, conductors 180, 178, 175, motor 43, conductors 173, 171.

As soon as the slide changer leaves its slide viewing position, two operations occur. First, finger 56 on drive arm 50 disengages itself from cycle-stop switch 57 allowing the latter to snap to its closed position. Second, lug 128 on the slide changer disengages itself from the lower end of arm 118 thereby allowing spring 125 to disengage detent 122 from ratchet teeth 123 on the driven gear. This disengagement of pawl 122 from the ratchet teeth on the driven gear allows coil spring 97 to rotate the driven gear in a clockwise direction (FIG. 7) until arm 89 comes into engagement with rubber grommet 90 for re-setting or re-cycling the timing means. This clockwise rotation of the driven gear under hte influence of spring 97 is rapid enough so that it may occur during the interval between engagement of teeth 83 on pinion 82 with teeth 86 on the driven gear. Of course this rotation of the driven gear by spring 97 causes corresponding rotation of switch actuating member 94 for re-setting the same, i.e., for positioning the same in the position illustrated in FIGS. 4 and 8.

This re-positioning or re-setting of switch actuating member 94 allows contacts 138a and 139a to separate, and this occurs slightly after the slide changer begins its movement from its slide viewing position to its loading position. However, before contacts 138a and 139a separate, cycle-stop switch 57 is allowed to close. The circuit for energizing cycle motor 43 after contacts 138a and 139a have separated is as follows: conductors 168, 176, switch 57, conductor 175, motor 43, conductors 173, 171.

As soon as the slide changer is returned by motor 43 to its slide viewing position, cycle-stop switch 57 is opened and at substantially the same time lug 128 engages arm 118 for bringing detent 122 into engagement with ratchet teeth 123 thereby commencing another timed period before the slide changer is cycled again. The next timed cycle of operation of the timing means before the next slide changer is cycled again is exactly as just described above.

Now let it be assumed that it is desired to view slides for a fifteen second period of time. To provide this interval movable contact 151 of selector switch 150 is brought into engagement with contact 154. When the slide changer is moved to its slide viewing position, detent 122 will be brought into engagement with the ratchet teeth of the driven gear for commencing a timed cycle of operation of the timing means. After the first five seconds of time, surface 130 will engage tip 138b for closing contacts 138a and 139a. The cycle motor circuit will not be completed at this time because of the break in the circuit between movable contact 151 and contact 152. After ten seconds a total elapsed time, surface 131 will engage tip 138b thereby bringing contact 139a into engagement with contact 140a while maintaining the engagement between contacts 138a and 139a. Again, the cycle motor circuit will not be completed because of the break in the circuit between contact 151 and contact 153. After fifteen seconds of total elapsed time, surface 132 will engage tip 138b for bringing contact 140a into engagement with contact 141a while maintaining engagement between contacts 138a–140a. The cycle motor circuit will now be completed because of the engagement of contacts 151 and 154. The circuit for the fifteen second viewing time is as follows: conductors 168, 170, movable contact 151, contact 154, blade 141, contacts 141a, 140a, 139a, 138a, blade 138, conductors 180, 178, 175, motor 43, conductors 173, 171. Just after the slide changer moves toward its loading position upon energizing of motor 43 in a manner just described, switch 57 is allowed to snap closed and switch actuator 94 is re-set allowing contacts 138a–141a to separate.

It is not believed necessary to explain the circuits for a ten or thirty second cycle of operation of timing means. It should suffice to say that when a ten second interval is desired, movable contact 151 is brougth into engagement with contact 153 thereby closing the circuit when contacts 138a, 139a and 140a are in engagement. When a thirty second interval is desired, movable contact 151 is engaged with contact 155, thereby closing the circuit when all of the blade contacts are brought together.

It should be pointed out that if movable contact 151 of selector switch 150 is not in engagement with any of the fixed contacts of the selector switch, i.e., if it is not desired to use the timing means for cycling the slide changer, if the slide changer remains in the slide viewing position for more than thirty seconds when a slide is being viewed, pinion gear 82 will rotate driven gear 87 until teeth 83 engage the last tooth 86' (FIG. 7) on the driven gear thereby resulting in constant oscillation of the latter as long as detent 122 remains in contact with ratchet teeth 123. If slides are to be viewed for periods of time substantially longer than thirty seconds, it may be desirable to de-activate the timing means by snapping selector plate 62 to its position for holding power take-off wheel 60 out of engagement with drive shaft 23.

It will be understood that the invention is not to be limited to the particular intervals of time which have been set forth above for purposes of illustrating the invention. The various intervals or periods of time may be varied as desired by varying the speed of rotation of the driven gear, by changing the number of teeth on pinion gear 82, by changing the shape and/or size of the switch actuating member, for example.

A very important feature of the timing means of this invention resides in the fact that if the slide changer is moved from its slide viewing position before the expiration of a timed period between cycles of operation of the slide changer, the next slide will be viewed for the full time set on selector switch 150 and not for the period of time that remained after the slide changer was moved from its slide viewing position. In other words, each time the slide changer moves away from its slide viewing position, whether it is moved by closing of the contacts by switch actuating member 94, moved by actuation of the "cycle" switch or moved by hand, disengagement of lug 128 with arm 118 causes the switch actuating member to be re-set for timing the next period of time shortly after they have been viewed and without waiting for the full period of time set by selector switch 150 to expire.

While the invention has been shown in but one form it is not to be so limited, but on the contrary it is susceptible of various changes and forms without departing from the spirit and scope of the appended claims. For example, the invention is not to be limited to the particular shape of switch actuating member illustrated. A rotary switch actuating member with a single switch engaging surface could be provided with a plurality of separate switches mounted in a circular or arcuate path about such a switch actuating member. Further, a single surface actuating member could be provided with a single switch which is angularly adjustable about the axis of rotation of such a switch actuating member, the angular or arcuate distance between the actuating member and surface adjustable switch determining the time required for the switch actuating member to move into engagement with the switch.

I claim:

1. In a slide projector of the type including a slide changer movable between at least two opposite positions, an electric cycle motor for moving the slide changer, switch means connected with the motor so that actuation of the switch means causes energization of the motor when electric power is supplied thereto, the improvement which comprises, a movable switch actuating member for actuating said switch means and mechanical timing means adapted, after a timed cycle of operation, to move said member into a position for actuating said switch means, said timing means including timer-start means adapted to cooperate with means associated with the slide changer, when the latter is in one of its opposite positions, for initiating a timed cycle of operation of the timing means, said switch means including a plurality of yieldably mounted contacts, and said timing means further including gear train means for sequentially closing said contacts in pairs at predetermined intervals of time.

2. In a slide projector, the combination of a slide changer movable between at least two opposite positions, an electric cycle motor for moving the slide changer, switch means connected with the motor so that actuation of the switch means causes energizing of the motor when electric power is supplied thereto, a movable switch actuating member for actuating said switch means, and mechanical timing means adapted, after a timed cycle of operation, to move the member into a position for actuating said switch means, said timing means including means adapted to be engaged by said slide changer, when the latter is in one of its opposite positions, for initiating a timed cycle of operation of the timing means, said switch means including a plurality of yieldably mounted contacts, and said timing means further including gear train means for sequentially closing said contacts in pairs at predetermined intervals of time.

3. In a slide projector, the combination of a slide changer movable between at least two opposite positions, an electric cycle motor for moving the slide changer, switch means connected with the motor so that actuation of the switch means causes energizing of the motor when electric power is supplied thereto, a movable switch actuating member for actuating the switch means, and mechanical timing means adapted, after a timed cycle of operation, to move the member into a position for actuating said switch means, said switch means including selector means for selecting a number of different timed cycles of operation, said timing means including means adapted to be engaged by said slide changer, when the latter is in one of its opposite positions, for initiating a timed cycle of operation of the timing means, said switch means including a plurality of yieldably mounted contacts, and said timing means further including gear train means for sequentially closing said contacts in pairs at predetermined intervals of time.

4. In a slide projector, the combination of a slide changer movable between at least two opposite positions, an electric cycle motor for moving the slide changer, first and second switches and a selector switch therefor, circuit means connecting all of said switches with said motor so that closing of the selected first or second switch causes energizing of the motor when electric power is supplied thereto, and mechanical timing means for closing said first switch after a first predetermined period of time and for closing said second switch after a second longer predetermined period of time, said timing means including means adapted to be engaged by said slide changer, when the latter is in one of its positions, for initiating a timed cycle of operation of the timing means.

5. In a slide projector, the combination of a slide changer movable between at least two opposite positions, an electrical cycle motor for moving the slide changer, first and second switches and a selector switch therefor, circuit means for connecting all of said switches with said motor so that closing of the selected first or second switch causes energizing of the motor when electric power is supplied thereto, a movable switch actuating member for successively closing said first and second switches, and mechanical timing means adapted, after successive timed cycles of operation, first to move said member into a position for closing said first switch and then to move said member into a position for closing said second switch, said timing means including means adapted to be engaged by said slide changer, when the latter is in one of its opposite positions, for commencing the cycles of operation of the timing means.

6. In a slide projector, the combination of a slide changer reciprocal between at least two opposite positions, an electric cycle motor for reciprocating the slide changer, switch means including first and second switches, a selector switch for selecting either said first or second switches, circuit means for connecting all of said switches with said motor so that closing of the selected first or second switch causes energizing of the motor when electric power is applied thereto, switch actuating means including a driven gear and a switch engaging surface fixed relative to one another so that rotation of the driven gear in one direction results in movement of said surface in a first direction, which surface is successively movable in said first direction through first and second cycle paths to engage said switch means for successively closing said first and second switches, respectively, resilient means constantly urging said surface in a direction opposite said first direction, powered gear train means adapted, during timed cycles of operation, successively to move said surface through said first and second cycle paths, said gear train means including a drive gear having teeth adapted to mesh with teeth on the driven gear in a manner for providing periodic engagement between the driving gear and driven gear, whereby the latter is periodically rotated through a fixed angle in said one direction, movement of the driven gear through said fixed angle being such that said surface is moved in said first direction a distance substantially less than the distance of either said first or second cycle paths, arm means movable between a position in frictional engagement with said switch actuating means and a position clear of said switch actuating means, said arm means being adapted in the first mentioned position thereof to prevent movement of said surface in a direction opposite said first direction whereby said surface is intermittently and successively moved by the drive gear thereby to move said surface through said first and second cycle paths, said arm means being adapted to be engaged by said slide changer, when the latter is in one of its opposite positions, to move the arm means into its first mentioned position thereby to cause initiation of a timed cycle of operation of the slide changer.

7. In a slide projector of the type including a slide changer movable between at least two opposite positions, an electric cycle motor for moving the slide changer, a switch connected with the motor so that actuation of the switch causes energizing of the motor when electric power is supplied thereto, the improvement which comprises, switch actuating means adapted, after timed movement through a cycle path, to actuate said switch, electrically driven mechanical timing means for oscillating said actuating means, the stroke of movement of said actuating means during its oscillation being along said path but for a distance less than the distance of said path, a timer-start member adapted for engagement with said actuating means for converting oscillating movement of the same into intermittent movement of said actuating means along said cycle path, said member being adapted to be placed into temporary engagement with said actuating means when the slide changer is in one of its opposite positions, by being engaged by means associated with the slide changer and responsive to movement of the latter.

8. In a slide projector, the combination of a slide changer movable between the two opposite positions, an electric cycle motor for moving the slide changer, first and second switches and a selector switch therefor, circuit means connecting all of said switches with said motor so that closing of the selective first or second switch causes energizing of the motor when electric power is supplied thereto, switch actuating means adapted, after timed movement through a cycle path, first to close said first switch and then to close said second switch, electrically driven mechanical timing means, which timing means are associated with said actuating means for imparting timed oscillating movement to the latter, the stroke of movement of said actuating means during its oscillation being along said path but for a distance less than the distance of said path, a timer-start member adapted for engagement with said switch actuating means for converting oscillating movement of the same into intermittent movement along said cycle path, said member being placed into temporary engagement with said switch actuating means by engagement of the member with said slide changer when the latter is in one of its opposite positions.

9. In a slide projector, the combination of a slide changer reciprocal between a slide viewing position and a loading position, an electric cycle motor for reciprocating the slide changer between said positions, switch means connected with the motor so that actuation of the switch means causes energizing of the motor when electric power is supplied thereto, movable switch actuating means for actuating said switch means, and electrically driven mechanical timing means adapted, after a timed cycle of operation, to move said switch actuating means into a position for actuating the switch means, said timing means including timer-start means adapted to be engaged by said slide changer, when the latter is in its viewing position, for commencing a timed cycle of operation of the timing means, said timing means being adapted automatically to re-set itself when said timer-start means is disengaged from said slide changer upon movement of the latter from its slide viewing position toward its loading position, said switch means including a plurality of yieldably mounted contacts, and said timing means further including gear train means for sequentially closing said contacts in pairs at predetermined intervals of time.

10. In a slide projector, the combination of a slide changer movable between a slide viewing position and a loading position, an electric cycle motor for moving the slide changer between the positions, a switch connected with the motor so that actuation of the switch causes energizing of the motor when electric power is supplied thereto, switch actuating means adapted, after timed movement through a cycle path, to actuate said switch, electrically driven mechanical timing means including resilient means for oscillating said actuating means, the stroke of movement of said actuating means during its oscillation in one direction being along said path but for a distance less than the distance of said path, a timer-start member adapted for engagement with said actuating means for converting oscillating movement of the same into intermittent movement along said cycle path, said member being placed into temporary engagement with said actuating means by engagement of the member with said slide changer when the latter is in its viewing position, said resilient means being adapted automatically to re-set said timing means when said timer-start means is disengaged from said slide changer upon movement of the latter from its viewing position toward its loading position.

11. In a slide projector, the combination of a slide changer reciprocal between at least two opposite positions, an electric cycle motor for reciprocating the slide changer, a switch connected with the motor so that actuation of the switch causes energizing of the motor when electric power is applied thereto, switch actuating means including a driven gear and a switch engaging surface fixed relative to one another so that rotation of the driven gear in one direction results in movement of said surface in a first direction, which surface is movable in said first direction through a cycle path for engagement with the switch to actuate the same, resilient means constantly urging said surface in a direction opposite said first direction, powered gear train means adapted, during a timed cycle of operation, to move said surface into engagement with said switch, said gear train means including a drive gear having teeth adapted to mesh with teeth on the driven gear in a manner for providing periodic engagement between the drive gear and the driven gear, whereby the latter is periodically rotated through a fixed angle in said one direction, movement of the driven gear through said fixed angle being such that said surface is moved in said first direction a distance substantially less than the distance of said cycle path, arm means movable between a position in frictional engagement with said switch actuating means and a position clear of said switch actuating means, said arm means being adapted in the first mentioned position thereof to prevent movement of said surface in said opposite direction whereby said surface is intermittently and successively moved by the drive gear thereby to move said surface through said cycle path, said arm means being adapted to be engaged by said slide changer, when the latter is in one of its opposite positions, to move the arm means into its first mentioned position thereby to cause initiation of a cycle of operation of the slide changer.

12. The combination according to claim 11 wherein said resilient means automatically re-sets said switch engaging surface when said arm means is disengaged by said slide changer.

13. The combination according to claim 11 further defined by, said gears forming a part of said gear train including a power take-off roller, a blower motor including a drive shaft, said power take-off roller having its peripheral portion in frictional engagement with said shaft so that the latter powers said gear train.

14. In a slide projector, the combination of a slide changer reciprocal between at least two positions, an electric cycle motor for reciprocating the slide changer, a switch connected with the motor so that actuation of the switch causes energizing of the motor, when electric power is supplied thereto, switch actuating means including a driven gear and a member having a surface rotatable through a cycle angle for engagement with the switch to actuate the same, said driven gear and said member being connected relative to one another so that rotation of the gear in one direction results in rotation of said surface in a first direction, and mechanical timing means for moving said surface, after a predetermined length of time, into engagement with the switch, said timing means including a powered gear means for periodically rotating the driven gear in said one direction through a fixed angle which results in movement of said surface through an angle substantially less than said cycle angle, resilient means constantly urging said surface in a second direction opposite said first direction, and timer-start means operable for temporarily preventing rotation of said surface in said second direction thereby to allow said surface to be successively rotated through said cycle angle for actuation of said switch, said timer-start means being brought into operation for temporarily preventing rotation of said surface in said second direction by engagement of said timer-start means with said slide changer when the latter is in one of its opposite positions.

15. The combination according to claim 14 wherein said gear means is electrically powered independently of said cycle motor.

16. The combination according to claim 14 further defined by, said gear means including a power take-off roller, a blower motor including a drive shaft, said power take-off roller having its peripheral portion in frictional engagement with said shaft so that the latter powers said gear means.

17. In a slide projector, the combination of a slide changer reciprocal between at least two positions, an electric cycle motor for reciprocating the slide changer, a blade type switch including at least three blades having respective corresponding ends mounted in parallel, spaced-apart, aligned relation, each of said blades mounting a contact at said end thereof for providing first and second pairs of opposed contacts defined by a first outer contact, an inner contact and a second outer contact, which inner contact is adapted to conduct current between both outer contacts when the inner contact simultaneously engages the same, said first outer contact and said inner contact defining the first pair of contacts and said second outer contact and said inner contact defining the second pair of contacts, a timer-select switch having at least two contacts, the first contact corresponding to a first period of time and the second contact corresponding to a second greater period of time, said first outer contact being electrically connected with said second contact and said inner contact being electrically connected with said first contact, said timer-select switch having a movable contact selectively engageable with said first and second contacts, circuit means connecting said cycle motor, said movable contact and said second outer contact so that upon the application of electric power to the projector said motor is energized either when the movable contact engages said first contact and said first pair of contacts is closed or when the movable contact engages said second contact and both pairs of contacts are closed, switch actuating means including a driven gear and a movable member, said member being disposed adjacent the blade mounting said second outer contact and being adapted for engagement with said blades, said member being connected with said driven gear so that rotation of the latter in one direction results in movement of said one member in a first direction, said member being configured so that movement of the same in said first direction through a first cycle path results in closing of said first pair of contacts and continued movement of the member in said first direction through a second cycle path results in closing of both of said pairs of contacts, resilient means constantly urging said member in a direction opposite said first direction, powered gear train means adapted, during a cycle of operation, to move said member into engagement with said blade and through said cycle paths, said gear train means including a drive gear having teeth adapted to mesh with teeth on said driven gear in a manner for providing periodic engagement between the drive gear and the driven gear, whereby the latter is periodically rotated through a fixed angle in said one direction, movement of the driven gear through said fixed angle being such that said member is moved in said first direction a distance substantially less than the distance of either of said cycle paths, arm means movable between a position in frictional engagement with said switch actuating means and a position clear of said switch actuating means, said arm means being adapted in the first mentioned portion thereof to prevent movement of said member in said opposite direction whereby said member may be intermittently and successively moved by the drive gear thereby to move said member through said cycle paths, said arm means being adapted to be engaged by said slide changer, when the latter is in one of its opposite positions, to move the arm means into its first mentioned position thereby to cause initiation of a cycle of operation of the slide changer.

References Cited by the Examiner

UNITED STATES PATENTS 3,029,693    4/1962    Brumley et al. _______ 40—36 X
3,079,840    3/1963    McMaster et al. ______ 40—79 X EUGENE R. CAPOZIO, *Primary Examiner.*

WILLIAM GRIEB, *Assistant Examiner.*